B. F. LEE.
MAGNETIC WEDGE FOR DYNAMO ELECTRIC MACHINES.
APPLICATION FILED DEC. 14, 1912.
1,083,109.
Patented Dec. 30, 1913.
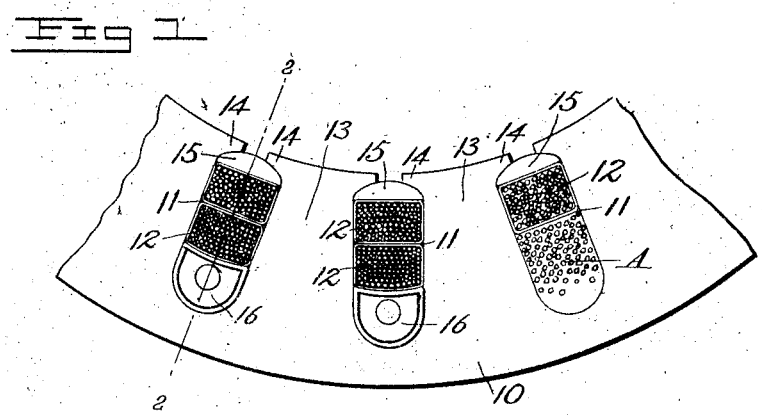
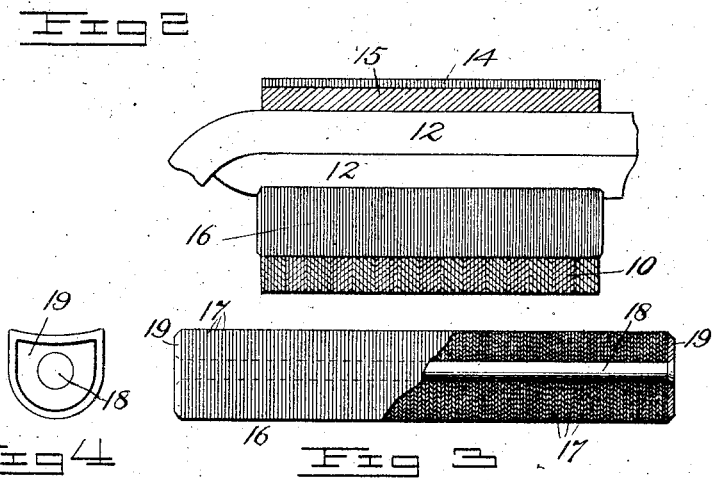
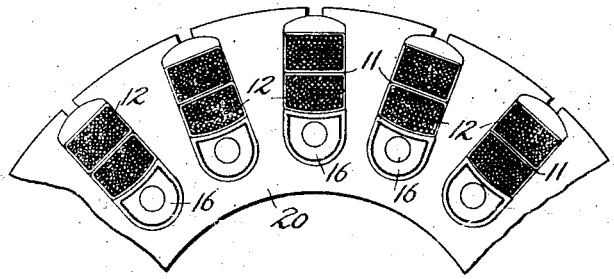
Witnesses
Inventor
B. F. Lee

UNITED STATES PATENT OFFICE.

BENJAMIN F. LEE, OF SCHOOLFIELD, VIRGINIA.

MAGNETIC WEDGE FOR DYNAMO-ELECTRIC MACHINES.

1,083,109.   Specification of Letters Patent.   Patented Dec. 30, 1913.

Application filed December 14, 1912. Serial No. 736,748.

*To all whom it may concern:*

Be it known that I, BENJAMIN F. LEE, a citizen of the United States, residing at Schoolfield, in the county of Pittsylvania and State of Virginia, have invented new and useful Improvements in Magnetic Wedges for Dynamo-Electric Machines, of which the following is a specification.

This invention relates to dynamo electric machines of that type in which the rotor or stator, preferably made of laminated iron, is magnetized by coils of wire seated in a plurality of grooves or slots formed in its edge, the object of the invention being to produce in a machine of this type a coil carrying member upon which the wire may be easily and quickly wound by threading it through the slots or grooves which are made deeper than the coils require to permit ready winding. After winding, the coils are crowded toward the outer ends of the grooves or slots by magnetic wedges driven into the bottom of the slots against the coils.

In certain types of induction motors, the stator or rotor is commonly made with a number of open radial grooves or slots, the open ends of which are of less width than the remainder of the slots, and are known in the art as "overhung" or "partially closed" slots. Within these slots are placed the exciting coils. Among the advantages to be derived from such a construction may be mentioned low magnetizing current; low core loss; and a high power factor. The most serious objection to these "overhung" slots arises from the difficulty of winding the coils therein especially when repairs, such as replacing one or more damaged coils, are to be made. This objection is wholly overcome by the present invention, as the slots are made deeper than required for the coils, thus giving plenty of room for threading the wire through the slots without endangering its insulation. After replacing the coil, the spaces in the slots are filled by driving a novel magnetic wedge in the lower end of each slot against the lower coil.

Defective coils may be replaced, either by substituting form wound coils therefor, or by threading the wire through the slots. In the latter case, the increased length of slot gives full and sufficient room for that part of the coil which has to be threaded into a slot below another coil, or in the bottom of the slot, and particularly when the coil is nearly wound, the slot, in the present type of machine, becomes crowded and the insulation on the wire is liable to be damaged. No such trouble will be encountered in winding coils on machines constructed under the present invention, owing to the increased depth of the slot which provides all the space necessary for the passage of the wire.

In the drawings forming a part of this specification, Figure 1 is an end elevation of a portion of a stator of an induction dynamo-electric machine constructed in accordance with the present invention. Fig. 2 is a sectional view on the line 2—2. Fig. 3 is a side view of the improved magnetic wedge partly in section. Fig. 4 is an end view of the same. Fig. 5 is a cross-sectional view of the magnetic wedge. Fig. 6 is an end view of a rotor with the invention applied.

In the drawing, 10 indicates the stator of an electric generator or motor, made usually of laminated iron in annular form with a plurality of slots or grooves 11 in its concave surface to receive windings or coils of insulated wire 12. The grooves or slots 11 open on the concave surface of the stator 10, but are closed at their opposite ends. The teeth 13 between the slots 11 are provided at their free ends with thin, laterally projecting lugs or ribs 14 which overlie the open ends of the slots and partly close them, forming what is known as "overhung" or "partly closed" slots. Within each slot 11 and bearing against the overhanging lugs or ribs 14 is a plate or strip 15, preferably made of some non-magnetic material, against which that part of a coil 12 in the open end of the slot abuts. The slots 11 are made deeper than required to contain the two coils which are placed therein, to afford sufficient room for threading the coils therethrough when winding, without crowding or undue friction which endangers the insulation of the wire, particularly when threading the wire for the undermost coil in the bottom of the slot, as shown at A, Fig. 1. After the coils have been wound, they are forced to the outer ends of the slots and retained there by means of a wedge 16 driven into each slot between its bottom wall and the lowermost coil as shown in the drawing. This wedge 16 is a laminated structure, made of a number of thin iron plates 17 cut or punched in the proper shape to fit the space in the slot below the coil and connected by a pin 18 passing through the plates and riveted or otherwise secured at its ends. A plate of brass or other suitable material 19 is placed on each end of the magnetic wedge and secured in place by the pin 18. The edges of the plates 19 are tapered or rounded as shown to facilitate the introduction and driving of the wedge into the slot. The ends of the wedges may project slightly beyond the slots on each side if desired. Among the advantages of this construction is the placing of the coils nearer the air gap so that the lines of force will cut the coils instead of passing above them, as in those constructions which place the wedges between the outer coils and the lugs or ribs 14. There being only a thin non-magnetic plate or strip 15 between the coils and the pole faces of the teeth 13, there are practically no electrical losses due to eddy currents, nor magnetic leakage. Another advantage of the herein described construction resides in the ease and rapidity with which machines may be repaired by threading the wire to form a new coil through the slots instead of substituting a form wound coil for the defective one. Where form wound coils are used that portion of the coil in the bottom of the slot can not be removed therefrom until the other coil in the outer part of the slot has been raised and wholly withdrawn therefrom, which in the case of small machines presents two difficulties. In the first of these the ends fill the field bore thereby making it difficult for the workmen to remove the damaged coil and put in a new one, and, secondly, in raising the ends of coils, it is necessary to pull them up a considerable distance thereby bending the end turns which is liable to damage the insulation of the wire especially if the machine has been run for some time, in which case, the insulation has become dry and is easily damaged. No such difficulties are encountered when the new coils are applied by threading the wire through the slots. But in threading the coils in machines as at present constructed there is great danger of wearing the insulation from the wire as it is passed through the lower portion of the slot owing to the crowded condition of the slot as it fills with wire. It is this difficulty which the present invention seeks to overcome by making the slot deeper than necessary to hold the coils, and after winding the coils to fill the extra space below the undercoil with a magnetic wedge. Another advantageous point in this construction is that the coils after being threaded in the slot and before insertion of the wedge, may be pulled out at one side and wrapped with tape or other insulating material, after which they may be drawn back into position, the extra depth of the slots affording plenty of space for this purpose.

Fig. 6 illustrates a rotor 20 provided with radial grooves or slots 11 of greater depth than required for the coils with the coils 12 held in place by magnetic wedges 16 in the bottom of the slots, the construction and arrangement being the same as that used in the stator 10.

What I claim is,—

In a dynamo electric machine, the combination with a magnetizable member having a plurality of coil containing slots of greater depth than required to hold the coils, coils seated within said slots, and means at the outer ends of said slots to prevent the escape of said coils, of a laminated magnetic wedge in each slot having straight parallel opposite sides and a convex semi-circular connecting side to fit closely said slot, and a shallow concave side opposite the convex side to bear against the coil and hold it securely in the slot.

In testimony whereof I have hereunto set my hand in presence of two subscribing witnesses.

BENJAMIN F. LEE.

Witnesses:
J. A. GUY,
O. T. JEFFRIES.